United States Patent
Herges et al.

(10) Patent No.: US 11,897,489 B2
(45) Date of Patent: Feb. 13, 2024

(54) PROTECTIVE DEVICE FOR DECOUPLING ELECTRIC CONTROL CIRCUITS IN A REDUNDANT SYSTEM FOR AUTONOMOUS DRIVING

(71) Applicant: Knorr-Bremse Systeme Fuer Nutzfahrzeuge GmbH, Munich (DE)

(72) Inventors: Michael Herges, Munich (DE); Dieter Woerner, Eppingen (DE); Falk Hecker, Markgroeningen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 570 days.

(21) Appl. No.: 17/274,409

(22) PCT Filed: Aug. 26, 2019

(86) PCT No.: PCT/EP2019/072714
§ 371 (c)(1),
(2) Date: Mar. 8, 2021

(87) PCT Pub. No.: WO2020/052950
PCT Pub. Date: Mar. 19, 2020

(65) Prior Publication Data
US 2021/0269048 A1     Sep. 2, 2021

(30) Foreign Application Priority Data
Sep. 10, 2018   (DE) .................... 10 2018 121 957.1

(51) Int. Cl.
*G06F 17/00*     (2019.01)
*B60W 50/023*    (2012.01)
(Continued)

(52) U.S. Cl.
CPC ........ *B60W 50/023* (2013.01); *B60T 13/683* (2013.01); *B60T 17/221* (2013.01);
(Continued)

(58) Field of Classification Search
CPC ........... B60W 50/023; B60W 2510/18; B60W 60/00; B60T 13/683; B60T 17/221;
(Continued)

(56) References Cited

U.S. PATENT DOCUMENTS 7,636,615 B2 * 12/2009 Pfingsten .................. H02J 1/14
                                                        700/286
11,022,153 B2 *  6/2021 Green ........................ F04B 1/16
(Continued)

FOREIGN PATENT DOCUMENTS

DE        3624455 A1    1/1988
DE       10150379 A1    4/2003
(Continued)

OTHER PUBLICATIONS

Device for decoupling and protection from compensation currents in a redundant system for autonomous driving (Year: 2022).*
(Continued)

*Primary Examiner* — Ronnie M Mancho
(74) *Attorney, Agent, or Firm* — NORTON ROSE FULBRIGHT US LLP; Gerard A. Messina

(57) ABSTRACT

A device for decoupling and/or protecting against compensation currents when at least one electropneumatic actuator is used jointly by a plurality of independently voltage-supplied control unit devices in redundant systems for autonomous driving. The electropneumatic actuator has, in each case, a common connection, via which the electropneumatic actuator can be coupled and switched to a common connection of other electropneumatic actuators, and has at least one dedicated connection via which the at least one
(Continued)

electropneumatic actuator can be individually supplied with current. Switching devices, corresponding to the common connection and the number of dedicated connections of all the electropneumatic actuators, are arranged to apply or not apply a switched current in the at least one electropneumatic actuator. Provided is at least one current flow blocking device to prevent an unwanted current flow to a non-active electronic control unit of the first and second control unit devices.

10 Claims, 8 Drawing Sheets

(51) Int. Cl.
  *B60T 13/68* (2006.01)
  *B60T 17/22* (2006.01)
(52) U.S. Cl.
  CPC ... *B60T 2270/402* (2013.01); *B60T 2270/413* (2013.01); *B60W 2510/18* (2013.01)
(58) Field of Classification Search
  CPC ......... B60T 2270/402; B60T 2270/413; B60T 2270/414; B60T 13/68; B60T 17/22
  USPC .......................................................... 701/29
  See application file for complete search history.

(56) References Cited

U.S. PATENT DOCUMENTS

| | | | |
|---|---|---|---|
| 11,639,594 B2* | 5/2023 | McKinzie | E02F 9/2278 |
| | | | 701/50 |
| 2005/0035656 A1 | 2/2005 | Kuramochi et al. | |
| 2010/0243388 A1* | 9/2010 | Holzwarth | B60T 8/885 |
| | | | 188/158 |
| 2015/0006928 A1 | 1/2015 | Guillot et al. | |
| 2023/0125088 A1* | 4/2023 | Beuss | B60T 17/221 |
| | | | 188/106 P |

FOREIGN PATENT DOCUMENTS

| | | |
|---|---|---|
| DE | 10348162 B3 | 1/2005 |
| DE | 102005062907 B3 | 5/2007 |
| DE | 102008009043 B3 | 5/2009 |
| EP | 2090481 A2 | 8/2009 |
| FR | 2261912 A1 | 9/1975 |
| JP | H01173523 A | 7/1989 |
| WO | 2007079946 A1 | 7/2007 |

OTHER PUBLICATIONS

International Search Report dated Nov. 21, 2019 in connection with PCT/EP2019/072714.

* cited by examiner

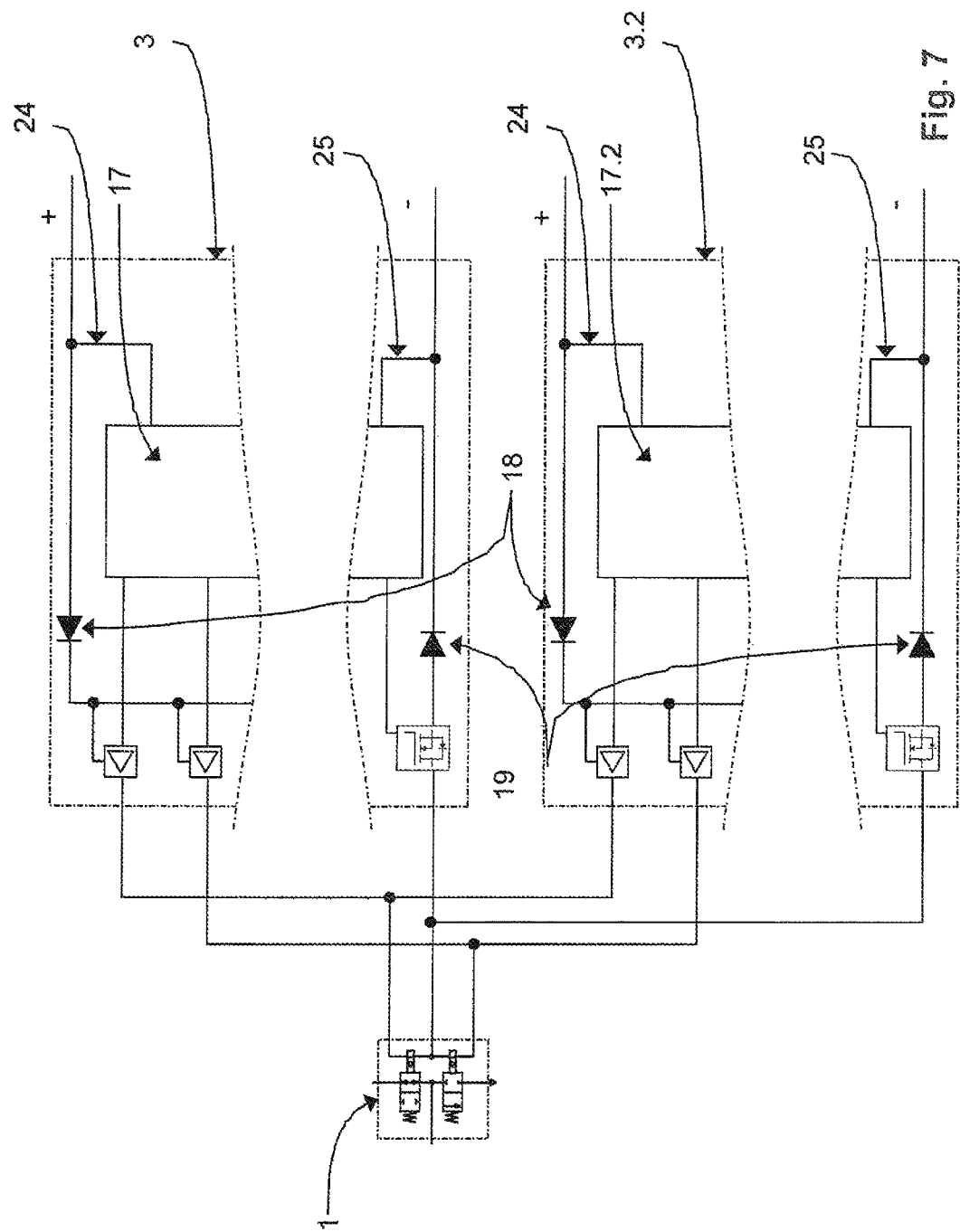

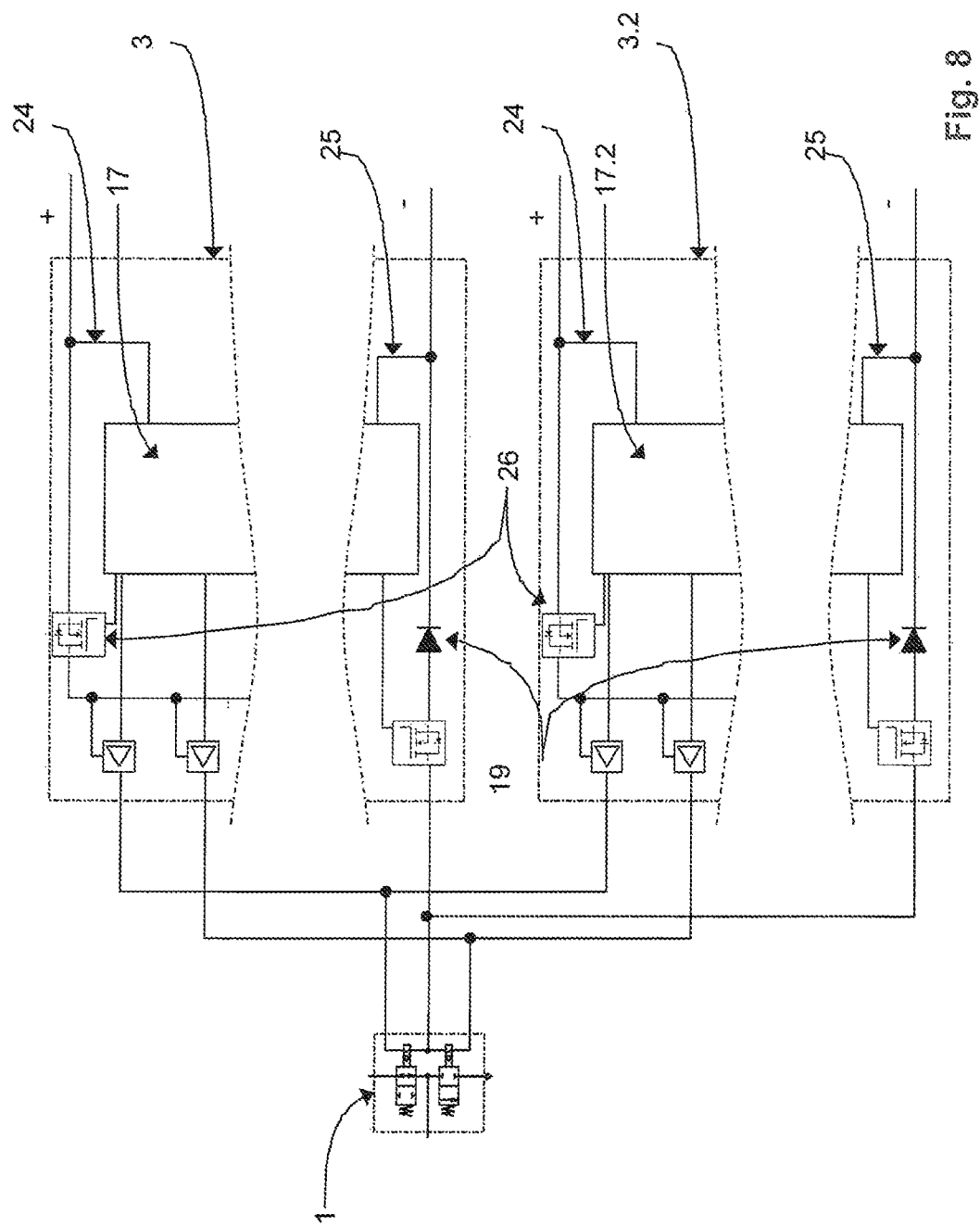

PROTECTIVE DEVICE FOR DECOUPLING ELECTRIC CONTROL CIRCUITS IN A REDUNDANT SYSTEM FOR AUTONOMOUS DRIVING

FIELD OF THE INVENTION

The present invention is based on a protective device for decoupling electric control circuits in a redundant system for autonomous driving.

BACKGROUND INFORMATION

In highly automated or autonomously driven vehicles, such as commercial vehicles, driver assistance systems instead of the driver control the vehicle and also monitor the vehicle's surroundings. In particular in the case of vehicles which perform autonomous driving functions at least temporarily without a driver who is in a position to intervene at all times (assistance functions from level 3 of a total of six levels 1 to 6, which relates to highly automated driving), an underlying system assumes the longitudinal and transverse guidance in a specific application, detects system limits and prompts a driver to take over with sufficient time in reserve. The driver no longer needs to permanently monitor the vehicle or system, but potentially be able to take control), brake systems must still be able to control pressure control valves (PCVs) even in the event of a fault in an electric control circuit or driving circuit, in order to still be able to perform electrically controlled functions, such as ABS, ESP, steering brake and the like, even in the event of a fault. However, in the event of a fault, for example a component failure, it may still be the case that the driver can no longer intervene and assume control of the vehicle, or at least no longer sufficiently quickly.

For safety reasons, critical electronic systems are therefore configured redundantly. For example, a redundancy of a voltage supply is ensured via multiple, for example two, independent voltage sources, which usually share a common ground, or else vehicles are fitted with multiple, for example two, independent electric drive circuits with a common ground (vehicle ground) for braking control.

In a compressed-air braking system, this applies in particular to the electronics of the braking system (i.e. the control units) as well as to the drivers of electropneumatic actuators, e.g. solenoid valves or pressure control valves. Whereas in a known system the electronics are configured redundantly by two separate control units, in many electropneumatic valves it is sufficient to connect one valve jointly to two redundant brake system control units and to control such valves by one or the other control unit depending on the situation.

FIG. 1 shows schematically and in detail an example structure of a braking system or braking scheme, having a first electronic control unit or ECU 3, which belongs to a so-called "standard" EBS system and can form a main brake control unit, and having a second electronic control unit or ECU 3.2, which can form a backup brake control unit and controls an iFBM (foot-brake module with integrated magnet), for example, as a backup system. In this example, the two ECUs 3, 3.2 are connected to a first and a second voltage supply 22.1, 22.2 and can communicate with each other and with other vehicle systems via a data bus 23.

If there are multiple independent control circuits present for the brake control, it must be ensured that a fault in one of the control circuits does not adversely affect another control circuit. In particular, a single fault must not lead to a simultaneous failure of all, for example both, control circuits, i.e. both control circuits must not be able to be rendered completely inoperative by a single fault.

FIG. 2 shows another arrangement of a pressure control valve having common and respective dedicated connections as well as controllable switches for driving them or supplying them with current. According to FIG. 2, a pressure control valve 1 consists of a first and a second solenoid valve, i.e. two solenoid valves, 2, which have a common connection 4.1 and have a dedicated connection 4.2, 4.3 each.

The controlling electronic control unit 3 has a switch 4, 16 for switching the common connections of all solenoid valves and a dedicated switch 5, 6, 7, 8 for each solenoid valve to be able to supply them with current individually.

FIG. 3 shows an overview of a more detailed drawing of the arrangement of a pressure control valve having common and dedicated connections, as well as controllable switches for driving them and/or supplying them with current according to FIG. 2. As shown in FIG. 3 the switches can be configured as electronic output stages 15, 16 controlled by a logic unit 17 of the electronic control unit 3. Here, a distinction is generally made between output stages which connect the supply leads of the solenoid valves to a positive (+) potential (high side), and output stages which connect the return leads of the solenoid valves to a negative (−) or ground potential (low side). The output stage that jointly switches one of the two paths for a plurality of solenoid valves can be a high-side or low-side output stage (common ground). To simplify matters, a negative or low-side connection is assumed in the following. A two-sided shutdown option is required to prevent unwanted supply of current to a solenoid valve even in the event of a short-circuit 10 in one of the supply leads, a short-circuit to the supply 9 or to ground, or a short-circuit 12 due to a fused output stage, i.e. one that is short-circuited between emitter and collector due to excess temperature and thus destroyed.

In order to detect other faults in a timely manner, in particular a short-circuit 11 between a supply and a return lead, a short-circuit 13 between a return lead and the supply and a short-circuit 14 between the return lead and ground, as well as a cable breakage, electrical values (voltages at the terminals, excessive currents) are usually permanently monitored and from time to time test pulses are applied to the magnets and the electrical response to them is evaluated.

If a pressure control valve is controlled by two or more electronic control units, however, when one of the electronic control units applies test pulses to a magnet, the permanent monitoring in another electronic control unit would respond and incorrectly detect a fault.

In addition, if two electric circuits have a common ground (−), a ground offset between two controlling electronic control units can result in the destruction of one or both of the electronic control units.

Furthermore, a defective electronic control unit may be unintentionally supplied "backwards" if it has been disconnected from its supply voltage due to a fault, for example, or, if the faulty electronic control unit has a short circuit from its supply to ground, a current flowing to the solenoid from an intact electronic control unit can then be short-circuited, because the parasitic diode of the high-side output stage of the faulty electronic control unit allows the current from the intact electronic control unit to pass through when this second electronic control unit turns on the solenoid valve. This could lead to unwanted and potentially hazardous actions of the first, faulty electronic control unit and/or prevent the solenoid valve of the pressure control valve in question from switching, or due to the excessive current flow, also destroy the second electronic control unit, thereby eliminating the required redundancy.

If an output stage for the individual supply of current to a solenoid valve in an electronic control unit were to be fused, it would not be sufficient if only this electronic control unit switched off the corresponding opposite-polarity, common output stage, since in this case the current would flow through the opposite-polarity, common output stage of the other electronic control unit and activate the solenoid valve unintentionally.

SUMMARY OF THE INVENTION

Based on the above-mentioned set of problems, an object of the present invention is to prevent fault currents between voltage supplies via the control units in a compressed-air braking system with redundant control units jointly using solenoid valves and in compliance with safety requirements. In addition, the invention is intended to ensure that a fault in a control circuit in a compressed-air braking system does not affect another control circuit.

This object may be achieved according to the invention by the features as described herein.

The invention is based on a decoupling protective device for electric control circuits when electropneumatic actuators are shared by independently voltage-supplied control units in redundant systems for autonomous driving.

The protective device, in an arrangement according to the invention, comprises a predetermined number of current blocking devices, which are connected in the positive and/or the ground path in the form of diodes and/or components or elements that are functionally equivalent to them, and which make it possible, even without galvanic isolation and in compliance with safety requirements, to prevent fault currents, compensation currents and other kinds of unwanted currents between power supplies via control units.

The protective device according to the invention for decoupling electric control circuits for use when at least one electropneumatic actuator is shared by a plurality of independently voltage-supplied control unit devices in a redundant system for autonomous driving provides that the at least one electropneumatic actuator has, in each case, a common connection via which the at least one electropneumatic actuator can be coupled and switched to a common connection of at least one other electropneumatic actuator, and has at least one dedicated connection, via which the at least one electropneumatic actuator can be individually supplied with current, that the plurality of control unit devices has at least one first control unit device comprising a first electronic control unit and a first number of switching devices corresponding to the common connection and the number of dedicated connections of all the electropneumatic actuators, and has at least one second control unit device comprising a second electronic control unit and a second number of switching devices corresponding to the common connection and the number of dedicated connections of all the electropneumatic actuators, and that the at least one first and second control unit devices are arranged to apply or not apply a switched current to the at least one electropneumatic actuator using said switching devices. At least one current flow blocking device is configured to prevent a resulting flow of current to the electronic control unit of another of the first and second control unit devices when one of the first and second control unit devices applies a switched current to the at least one electropneumatic actuator.

The features according to the invention as described above, in particular, advantageously prevent a voltage offset or a ground offset from causing an undesirable current flow between control units and/or electronic control devices in a redundantly configured system, such as a braking system, for autonomous driving, which in turn advantageously prevents one or all of the electronic control units from being destroyed due to the unwanted current flow, and a defective electronic control unit from again being unintentionally supplied "backwards" if it is disconnected from its supply voltage due to a fault, for example, or the current from an intact electronic control unit from being short-circuited to a solenoid valve if a faulty electronic control unit has a short-circuit from its supply to ground or a short-circuit from its ground to the supply voltage. An overall advantage of the features according to the invention is that the redundancy required for the autonomous system can also be maintained in the event of a fault or in the event of unsuitable voltage and/or ground conditions.

The measures specified in the subclaims enable advantageous extensions and improvements to the invention specified in the independent claims.

The first and second control unit devices may comprise a main brake control unit with the first electronic control unit and a backup brake control unit with the second electronic control unit, and the at least one electric actuator comprises a solenoid valve or a pressure control module containing solenoid valves, wherein the first and second control unit devices are arranged to jointly access coils of the solenoid valves and of the pressure control modules, the coils being configured to be activated via the switching devices, and wherein the switching devices contain semiconductor switches configured to be supplied via a common supply and ground path.

It also may be provided that the switching devices are configured as electronic output stages, which are arranged to be controlled by a logic unit of the first or second electronic control unit, one output stage in each case being an output stage that connects the supply leads of an electric actuator to a positive potential, or an output stage that connects the return leads of the electric actuator to a negative potential or ground potential.

More particularly, the current flow blocking device can be configured as a diode arranged on a terminal of each of the switching devices.

In this case, the diode may be arranged inside the first and second electronic control units or outside the first and second electronic control units and between the at least one electropneumatic actuator and each of the switching devices.

In this case, it may be alternatively that a plurality of diodes are arranged in a diode circuit arrangement forming a T-piece, which operates equivalent to a single diode.

Alternatively again, in this case it may be provided that a diode is arranged in a common current path section between the switching devices and each of the electronic control units as a current flow blocking device.

Alternatively again, in this case it can be that on the supply-potential side a reverse-polarized and actively switched output stage is arranged in a common current path section between the switching devices and the first and second electronic control unit as the current blocking device, and on the ground-potential side a diode is arranged in a common current path section between the switching devices and the first and second electronic control unit as the current blocking device.

As a further alternative device, in this case it can be that on the supply-potential side a reverse-polarized and actively switched output stage is arranged in a common current path section between the switching devices and the first and second electronic control unit as the current blocking device, and on the ground-potential side a reverse-polarized and actively switched output stage is arranged in a common current path section between the switching devices and the first and second electronic control unit as the current blocking device.

Furthermore, it may be advantageous in the device that the first and second electronic control units are configured to block both the switching devices of a positive and a ground line when no electric actuator is to be supplied with current; in a fault-free operation in accordance with predetermined criteria, that specifically only one of the first and second electronic control units performs the control of the at least one electric actuator; an electronic control unit of the first and second zo electronic control units in a passive state is configured not to carry out an active supply of current to an electric actuator for testing purposes; and that the electronic control unit in the passive state is configured to switch to an active state in the event of a fault in an active control unit of the first and second electronic control units which prevents further operation of the active control unit, and as a new active electronic control unit to assume the control of the electric actuator instead of the faulty electronic control unit from then on; wherein the electronic control unit in the passive state is configured to monitor voltage levels on its leads to the at least one electric actuator, to plausibility-check this monitoring with information transmitted to it by the active electronic control unit regarding a current activation of the at least one electric actuator, and to monitor a safe blocking of the current blocking device.

The invention relates not only to the protective device described above for electric control circuits when at least one electric actuator is used jointly by a plurality of independently voltage-supplied control unit devices in redundant systems for autonomous driving, but also to a method for controlling and/or operating such a device. As mentioned above, a braking system in which the device can be installed and the method can be carried out can be operated electrically, hydraulically, pneumatically, electrohydraulically or electropneumatically. The braking system may be a braking system of a passenger car or a commercial vehicle (towing vehicle and/or trailer) and may be of any kind and in particular may be operated electrically, hydraulically, pneumatically, electrohydraulically or electropneumatically. In this respect, the invention extends to cover all types of vehicles, including in particular passenger vehicles, commercial vehicles or heavy goods vehicles.

The control unit device can be formed by a separate control unit or by an existing electronic control unit, in particular by a vehicle control unit, a brake control unit of the braking device, or by the control unit of an electropneumatic brake control module.

Advantageous extensions of the invention are derived from the patent claims, the description and the drawings. The advantages of features and combinations of several features mentioned in the introduction are only exemplary and may have an alternative or cumulative effect without the advantages necessarily having to be obtain from embodiments according to the invention.

Further features can be found in the drawings—in particular illustrated geometries and relationships of several components to each other as well as their relative arrangement and effective connection. The combination of features of different embodiments of the invention or of features of different patent claims is also possible in deviation from the chosen cross references of the patent claims and is thereby encouraged. This also applies to those features which are shown in separate drawings or are mentioned in their description. These features can also be combined with features of different patent claims. Likewise, the features listed in the patent claims may be omitted for other embodiments of the invention.

Identical or identically acting components and assemblies are identified with the same reference numbers in different embodiments.

Below, exemplary embodiments of the invention is illustrated in the drawing and discussed in more detail in the following description. It is noted that the drawing represents, schematically and in the form of a detail, parts of a compressed-air braking system (an air-brake system) for vehicles known per se, such as those used in commercial vehicles. Therefore, for convenience the components of the compressed-air braking system or the air-brake system are only referred to insofar as their description and explanation contribute to a better understanding of the invention. In addition, for reasons of clarity, identical or at least similar components are not identified repeatedly in the drawing with the same reference numbers, but a reference number can be indicated once as an example and representative of such identical or at least similar components.

BRIEF DESCRIPTION OF THE DRAWINGS

FIG. 7 shows a further alternative arrangement of the current blocking device according to FIG. 4.

FIG. 8 shows a further alternative arrangement of the current blocking device according to FIG. 4.

DETAILED DESCRIPTION

Figure 1:
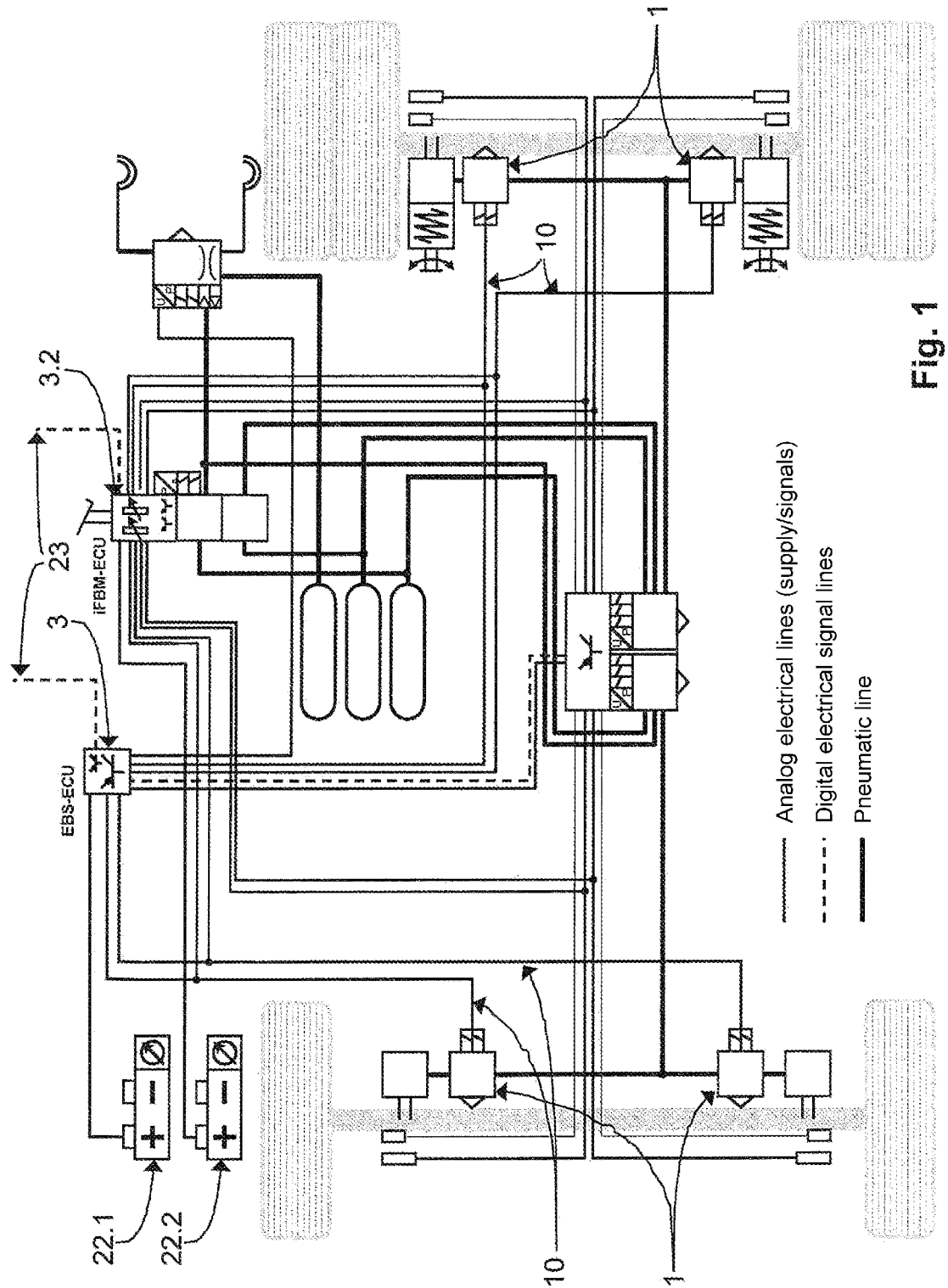
FIG. 1 shows schematically and in detail a structure of a known braking system or braking scheme with a first electronic control unit as a main control unit and a second electronic control unit as a backup control unit, as well as a plurality of solenoid valves used jointly by both control units.
Figure 2:
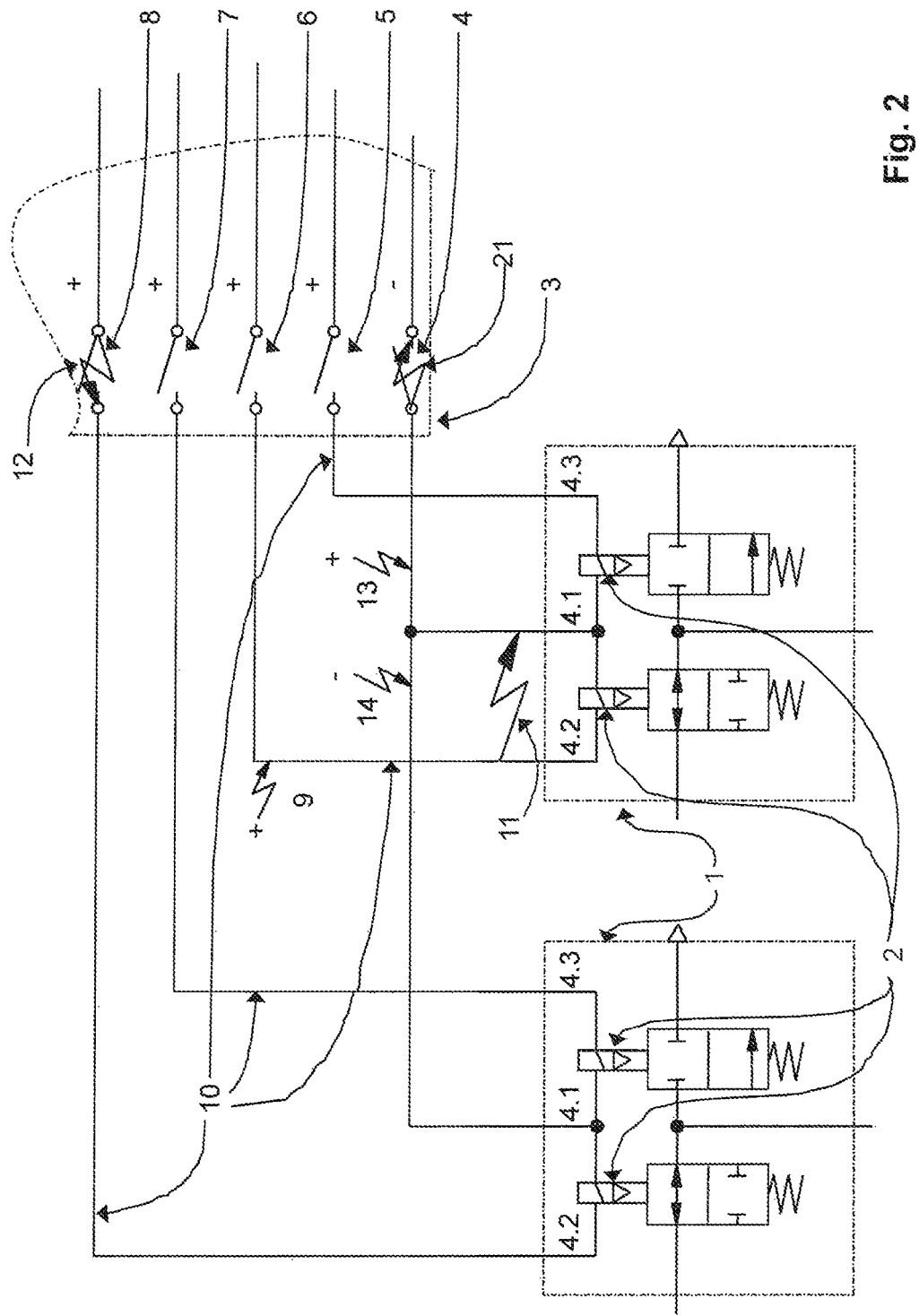
FIG. 2 shows a known arrangement of a pressure control valve having common and respective dedicated connections as well as controllable switches for driving them or supplying them with current.
Figure 3:
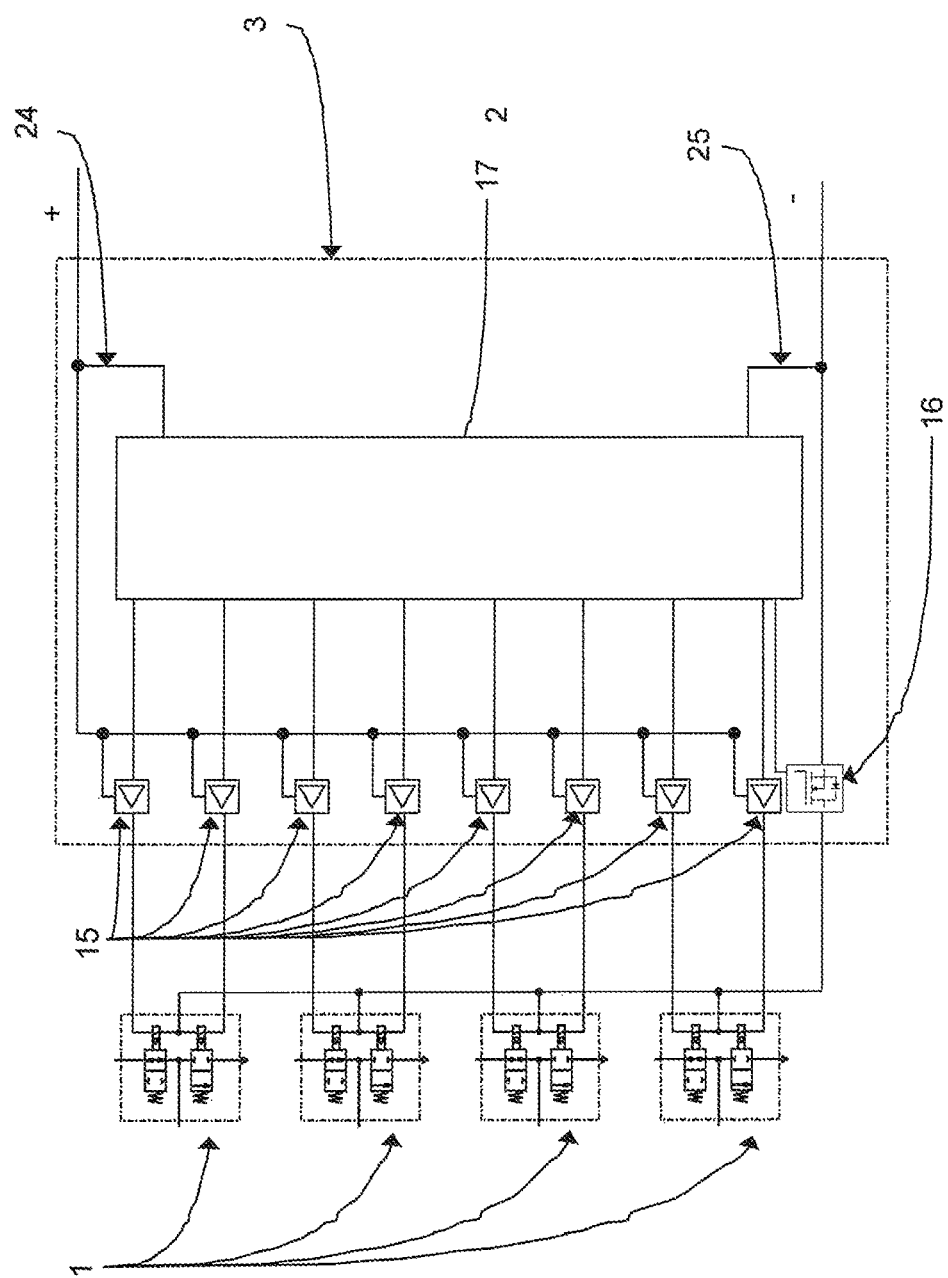
FIG. 3 shows a more detailed drawing of the known arrangement of a pressure control valve having common and dedicated connections, as well as controllable switches for driving them and/or supplying them with current according to FIG. 2.

As described above, FIG. 1 shows schematically and in detail a structure of a known braking system or braking scheme, here with a first electronic control unit 3 as a first control unit or main control unit, and a second electronic control unit 3.2 as a control unit or backup control unit, as well as a plurality of pressure control valves or solenoid valves 1 used jointly by both control units 3, 3.2.

Each pin of the pressure control valves 1 is connected to both the main control unit 3 and the backup control unit 3.2.

The main control unit 3 is supplied with a predetermined potential relative to a chassis ground by a first voltage supply 22.1, and the backup control unit 3.2 is supplied with the predetermined potential relative to the chassis ground by a second voltage supply 22.2. The main and backup control units 3, 3.2 are arranged and configured to switch switching devices 4, 5, 6, 7, 8, 16, each located in the supply path and in the ground path, for example suitable MOSFETs or otherwise suitable circuit breakers or output stages, as switches as required.

In the example braking scheme shown in FIG. 1, the first control unit 3, i.e. the main control unit, can contain a first electronic control unit or ECU (not shown in FIG. 1), which may belong to a "standard" EBS system or electronic braking system, and the second control unit 3.2, i.e. the backup control unit, can contain a second electronic control unit or ECU (not shown in FIG. 1), which controls an Ifbm (foot-brake module with integrated magnet) as a backup system. The two electronic control units in the two control units 3, 3.2 are each connected to the voltage supplies 22.1, 22.2 and can communicate with each other and with other vehicle systems via a data bus 23. The control units 3, 3.2 taken as a whole each form control unit devices.

It goes without saying that the part of a compressed-air braking system shown in FIG. 1 may be part of a braking system of any type of vehicle, such as a zo commercial vehicle in the form of a towing vehicle and/or a trailer thereof, and the compressed-air braking system can be of a known kind and in particular can be operated electrically, hydraulically, pneumatically, electrohydraulically or electropneumatically. It also goes without saying that the number, configuration and arrangement of the control units 3, 3.2, the pressure control valves 1 and the switches 4, 5, 6, 7, 8, 16 is not limited to the number, configuration and arrangement used in this example, provided the effects and advantages according to the invention can be achieved in an appropriate number, configuration and arrangement. Details of the compressed-air braking system known per se are omitted in the following description for simplicity, unless they contribute to a better or easier understanding of the invention.

In the case of a compressed-air brake system of the kind and usage described here, it must be ensured that a fault in one of the control circuits does not, if possible, adversely affect another control circuit. The following exemplary embodiment fulfils an objective that, in particular, not all control circuits, in this case, for example, both, should be rendered completely inoperative by a single fault.

According to the second exemplary embodiment, diodes or components or elements that are functionally equivalent to them are arranged in electronic control units, in a wiring harness (for example, in plugs or plug sockets of pressure control valves or electronic control units) and/or in a special T-piece, for example. During fault-free operation, specifically only one of the electronic control units performs the control of the pressure control valves. In all electronic control units, both the positive and the ground leads are blocked unless a solenoid valve is to be supplied with current.

Figure 4:
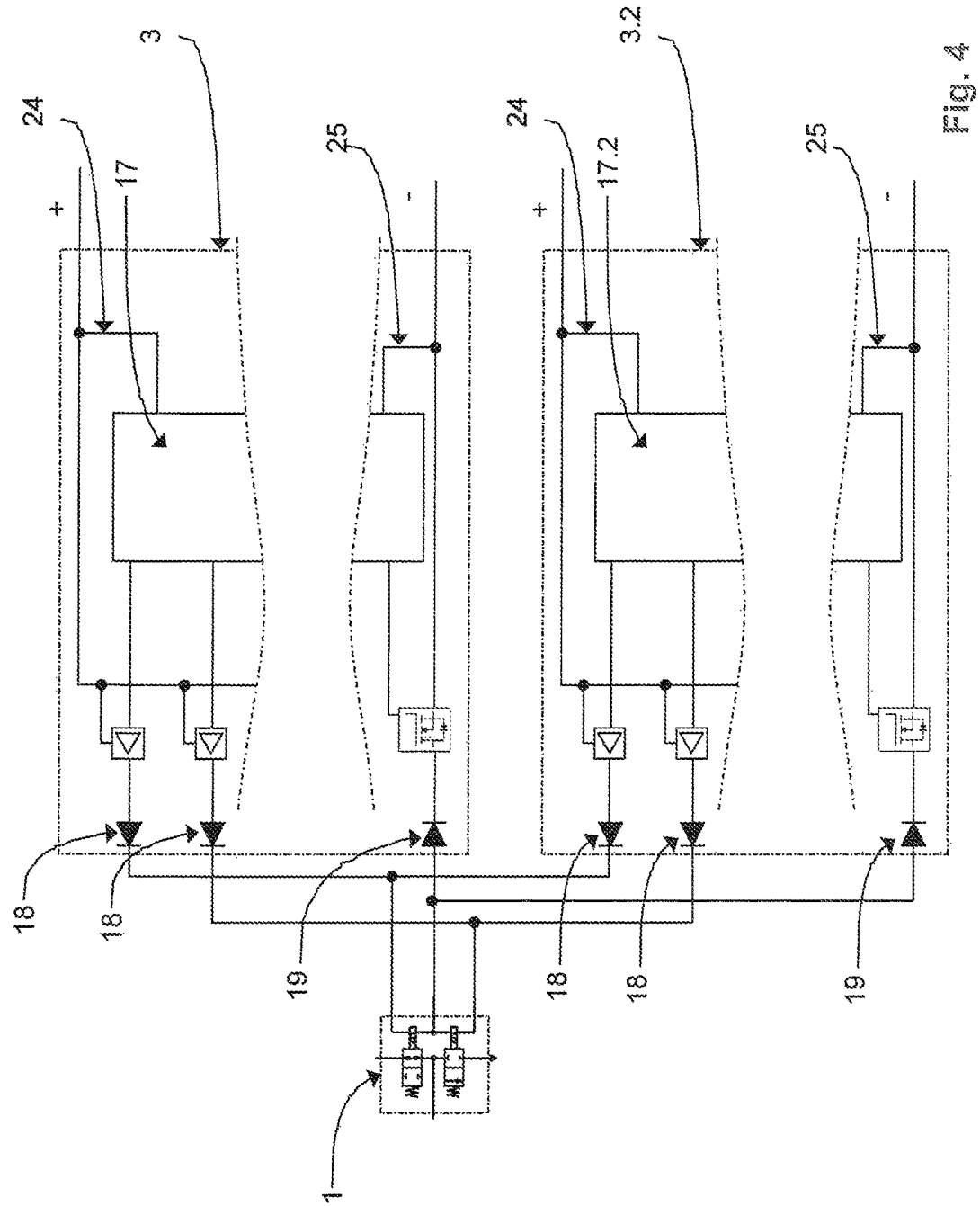
FIG. 4 shows a simplified representation with details of a redundantly configured compressed-air braking system with arrangement of a current blocking device according to an exemplary embodiment.

As shown in FIG. 4, according to the second exemplary embodiment an electropneumatic actuator, e.g. the pressure control valve 1, consists electrically of two solenoid valves 2, each having the common connection 4.1 and the dedicated or separate connection 4.2, 4.3.

The first controlling electronic control unit or ECU 3 and the second controlling electronic control unit or ECU 3.2 each have the switching devices 4, 16 for switching the common connections of all solenoid valves 2, and the switching devices 5, 6, 7, 8 respectively for each solenoid valve 2 for supplying their current individually. As mentioned above, the switching devices 4, 5, 6, 7, 8, 16 can be configured, for example, as electronic output stages 15, 16 which are controlled by a logic unit 17 in the first electronic control unit 3 and a second logic unit 17.2 in the second electronic control unit 3.2.

A distinction is made here between output stages which connect the supply leads of the pressure control valves 1 to positive (+) (high side), and output stages which connect the return leads of the solenoid valves 2 to negative (−) or ground (low side). An output stage that jointly switches one of the two paths for a plurality of solenoid valves 2 can be a high-side output stage or a low-side output stage (common ground). In the following description, a negative connection (low side) is conveniently assumed.

A two-sided shutdown option is necessary to prevent unwanted supply of current to a solenoid valve 2 even in the event of a short-circuit of one of the supply leads 10 to the supply voltage 9 or to ground, or due to a fused output stage 12.

Furthermore, in order to detect other fault cases in a timely manner, in particular short-circuits between a supply and a return lead 11, short-circuits between a return lead and the supply 13 and between a return lead and ground 14, as well as a possible cable breakage, electrical values (for example, voltages at the terminals, excessive currents) are permanently monitored and from time to time test pulses are applied to the magnets and the electrical response to them is evaluated.

As shown in FIG. 4, according to the present exemplary embodiment, a diode 18 and a diode 19 are each arranged at the respective connection of the switching devices or output stages 15, 16 in the direction of the solenoid valves 2 or their respective connection to the voltage supply or ground.

In the present exemplary embodiment according to FIG. 4, the diodes 18, 19 are arranged within the first and second control units 3, 3.2, as indicated in the figure by a broken line, and are arranged in a blocking direction such that they block current flowing in the direction of their respective electronic control unit 3, 3.2, i.e. current coming from external sources (blocking direction) and pass current flowing out of or away from their respective electronic control unit 3, 3.2 (forward direction).

Figure 5:
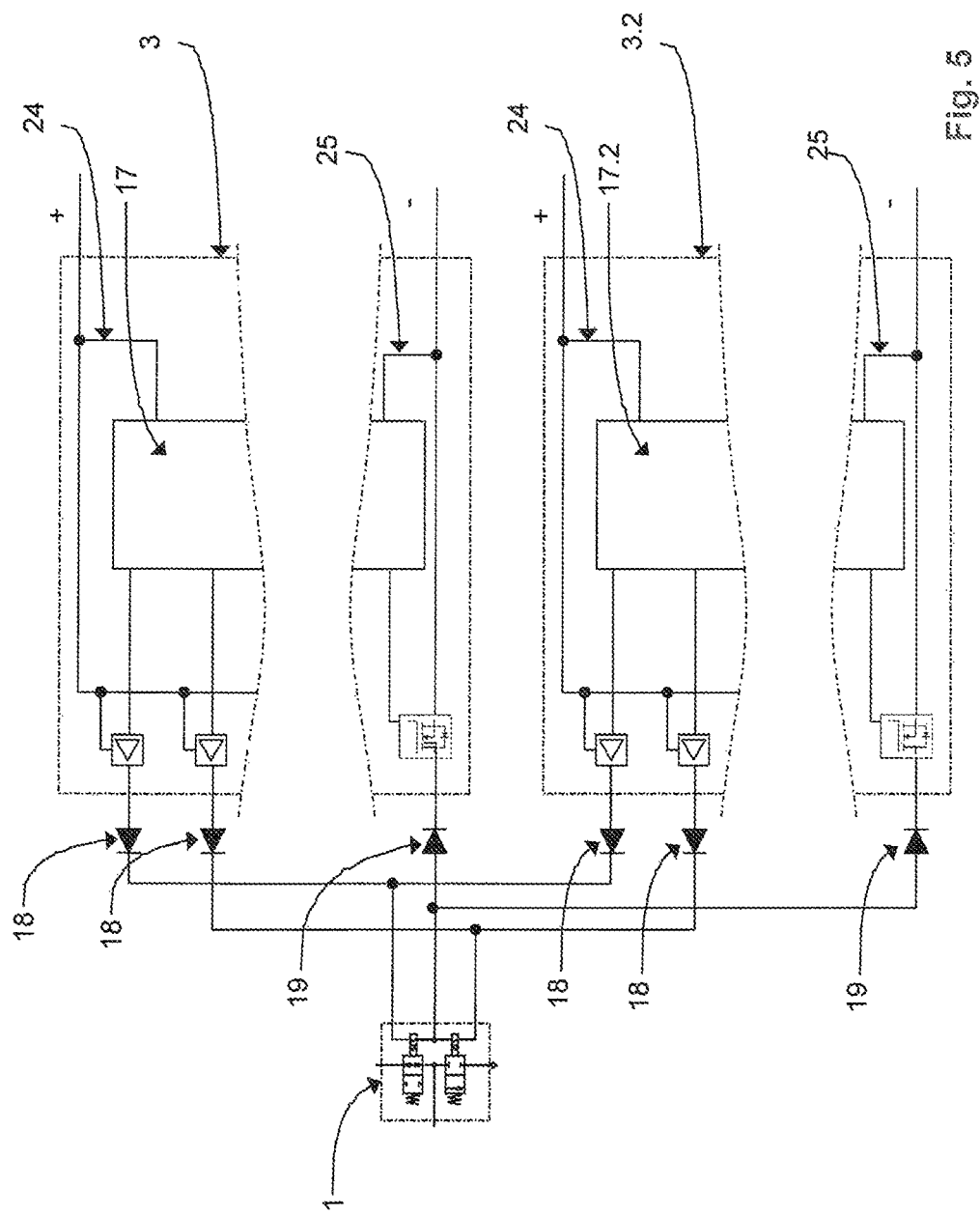
FIG. 5 shows an alternative arrangement of the current blocking device according to FIG. 4.
Figure 6:
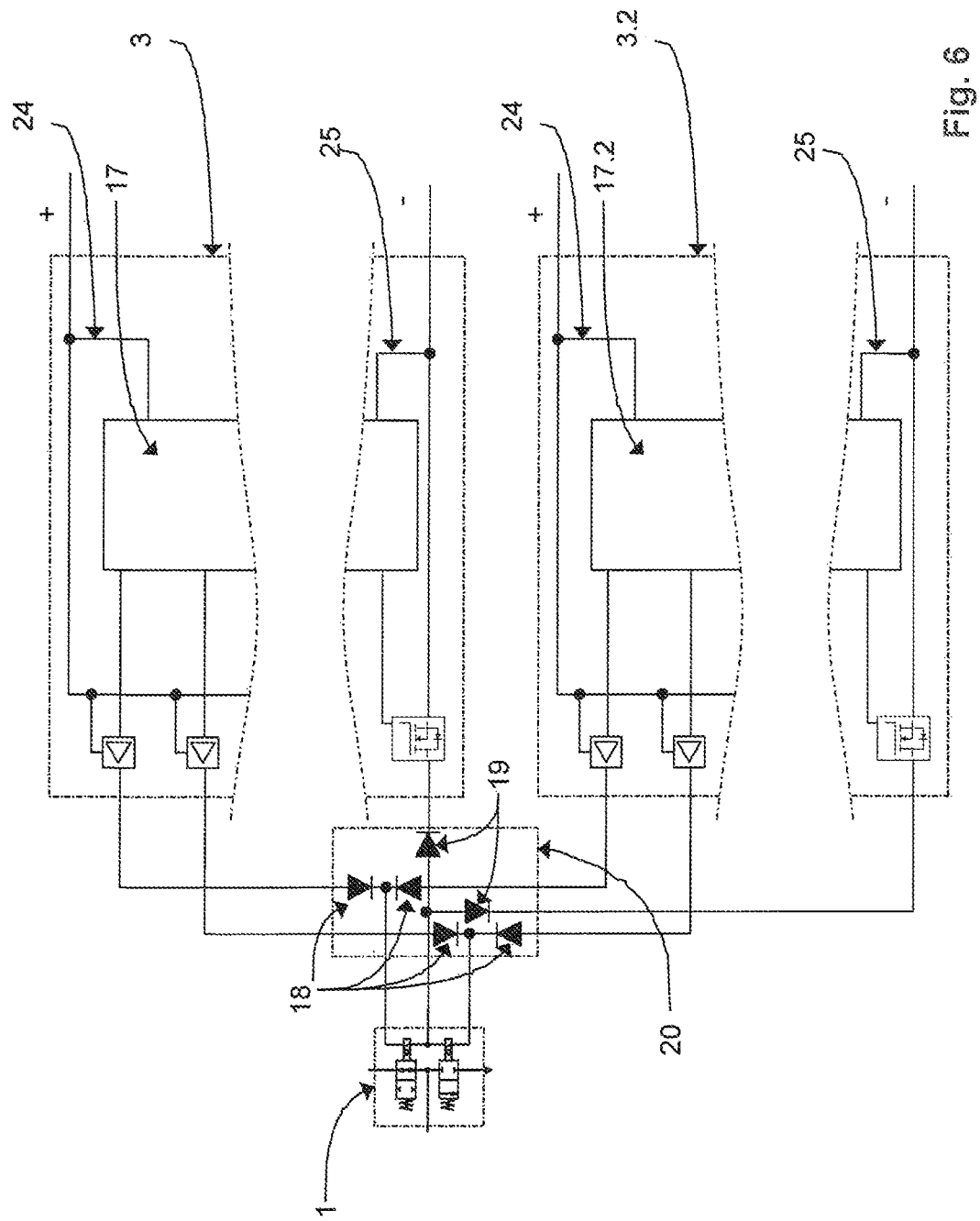
FIG. 6 shows a further alternative arrangement of the current blocking device according to FIG. 4.

It should be noted that in corresponding modifications of the present exemplary embodiment, outside the first and second control units 3, 3.2 (FIG. 5), these diodes 18, 19 can be replaced by a diode circuit arrangement 20 (FIG. 6) operating in an equivalent manner to a single or separately arranged diode 18, 19, by in each case in a common current path section between the switching devices or output stages 15, 16 and each of the electronic control units 3, 3.2 (FIG. 7) and/or by an additional, reverse-polarized and actively switched output stage 26 in conjunction with a diode 19 (FIG. 8). With regard to the last-mentioned modification, it is also possible to replace the diode 19 by a similarly additional actively switched output stage, or to replace only the diode 19 by a corresponding actively switched output stage 26 and leave the diode 18 as a diode, i.e. not to replace diode 18 by an actively switched output stage 26.

The diodes 18, 19, the circuit arrangement 20 operating equivalent to a single diode and/or by an additional, reverse-polarized and actively connected output stage 26, in their installation position or polarity are arranged and configured so as to prevent a current from flowing into the electronic control units 3, 3.2 in an undesirable or unintended, i.e. "wrong", direction via the connecting line to the pressure control valve 1 in the event of a fault and causing damage due to connections 24, 25 to the other electronic parts of the electronic control units 3, 3.2.

This will advantageously prevent a situation where, if both electric circuits have a common ground (−), a ground offset between the two controlling electronic control units 3, 3.2 could lead to the destruction of one or both of the electronic control units 3, 3.2, and where a defective electronic control unit 3, 3.2 is again unintentionally supplied "backwards", for example, if it is disconnected from its supply voltage due to a fault, or where the current is shorted to the solenoid valve 2 from an intact electronic control unit if a faulty electronic control unit has a short-circuit of its supply to ground, because the parasitic diode of the high-side output stage of the faulty electronic control unit would pass the current from the intact ECU when this intact electronic control unit turns on the solenoid valve 2. In such a fault case, unwanted and potentially dangerous actions could occur in the faulty electronic control unit, and the solenoid valve 2 of the pressure control valve 1 in question could be prevented from switching, or the intact electronic control unit could also be destroyed due to the excessive current flow. In such a case, the required redundancy would no longer be provided.

According to the present exemplary embodiment, in both electronic control units 3, 3.2, both the output stages of the positive and the ground lines are always blocked whenever none of the solenoid valves 2 is to be supplied with current. In a fault-free operation, specifically only one of the electronic control units 3, 3.2 performs the control of the pressure control valves 1. This division of tasks can be maintained during fault-free operation or can change periodically or according to other predetermined criteria, for example, according to criteria that are configured to harmonize the thermal loading of the output stages.

In addition, an electronic control unit in a passive state does not carry out any active supply of current to a solenoid valve 2 for test purposes as long as it is in the passive state. This prevents the output of test pulses to a magnet and, in an advantageous way, prevents the triggering of the values of a permanent monitoring in another electronic control unit and a resulting, unfounded fault detection.

However, the electronic control unit in a passive state can optionally also monitor the voltage levels on its leads to the pressure control valves 1 even in its passive state and, if necessary, check their plausibility using information with regard to the current activation of the solenoid valves transmitted to it by the active electronic control unit via a digital interface, e.g. a CAN bus. In particular, it is thus possible to monitor the safe blocking of the diodes 18, 19, for example, when the diodes 18, 19 are arranged in connections within the electronic control unit as shown in FIG. 4, or in front of the connections 24, 25 as shown in FIG. 7.

If a currently active first electronic control unit, such as the first electronic control unit 3, is no longer able for any reason (e.g. after loss of supply voltage, due to an electrical fault within the electronics, e.g. due to a fused output stage, a cable break in a lead 10 to a pressure control valve 1) to control the pressure control valves 1, a hitherto passive, second electronic control unit, for example the second electronic control unit 3.2, then becomes the active electronic control unit and takes over the control of the pressure control valves 1 from then on, assuming this is still possible.

For this purpose, this second electronic control unit 3.2, which changes from the passive state to the active state, for example, due to failure of communication with or to the first electronic control unit 3, can either detect itself that the previously active first electronic control unit 3 has failed. Alternatively, the previously active first electronic control unit 3, or another electronic control unit that has detected the fault in the previously active first electronic control unit 3, can notify the second electronic control unit 3.2 of the detected fault.

The second electronic control unit 3.2, which has now become active, can then detect on the basis of the voltage levels on its leads 10 whether one of the short-circuits 9, 13 is present or one of the dedicated (individual) output stages in the no longer active first electronic control unit 3 is fused 12. In these cases, continued operation of the pressure control valves 1 is no longer possible, because switching on the common switching device 16 or 19 would immediately and unintentionally activate a solenoid valve 2. The active electronic control unit therefore terminates the operation of the pressure control valves 1 in these cases.

In the absence of any of the above-mentioned fault conditions 9, 12, 13, i.e. in the absence of a short-circuit or fused output stage, the active electronic control unit can switch on the common switching device 4, 16 and one or more of the dedicated switching devices 5, 6, 7, 8 in a pulsed mode in order to detect a fault 11 due to an excessive current flow.

A short-circuit to ground 14 or a fused common output stage 16 of a faulty electronic control unit can be detected by the fact that, when the corresponding dedicated switching device or output stage is switched on in pulsed mode, no voltage is present on the return lead in front of the common output stage when the corresponding individual output stage is switched off.

If one of the above faults 9, 11, 12, 13 has been detected, continued operation of the pressure control valve 1 or the pressure control valves 1 is not possible. This is because in the event of a fused output stage for the dedicated supply of a solenoid valve 2 in an electronic control unit it would not be effective if only this electronic control unit switched off the corresponding opposite-polarity common output stage, since the current would then flow through the opposite-polarity common output stage of the other electronic control unit and activate the solenoid valve unintentionally. In the above-mentioned fault cases, the now active electronic control unit therefore terminates the operation of the pressure control valve 1 or the pressure control valves 1.

In the other fault cases 14, 21 of a short-circuit to ground or a fused common output stage of a defective electronic control unit, the operation of the pressure control valves 1 may possibly be continued, at least for a limited period of time, by the active electronic control unit which has taken over the operation of the pressure control valves 1 instead of the defective electronic control unit.

It should be noted that for each detected fault, an appropriate error message may be issued and transmitted if this has not already been initiated by the faulty electronic control unit or other monitoring system provided and configured for this purpose.

As described above, the invention relates to a device for decoupling and/or protection against compensation currents when at least one electropneumatic actuator 1 is used jointly by a plurality of independently voltage-supplied control unit devices 3, 3.2 in redundant systems for autonomous driving. The electropneumatic actuator 1 has, in each case, a common connection 4.1, via which the electropneumatic actuator 1 can be coupled and switched to a common connection 4.1 of other electropneumatic actuators 1, and has at least one dedicated connection 4.2, 4.3 via which the at least one electropneumatic actuator 1 can be individually supplied with current. A number of switching devices 4, 5, 6, 7, 8, 16, corresponding to the common connection 4.1 and the number of dedicated connections 4.2, 4.3 of all the electropneumatic actuators 1 is arranged to apply or not apply a switched current in the at least one electropneumatic actuator 1. The invention provides at least one current flow blocking device 18, 19, 21, which is configured to prevent an unwanted current flow to a non-active electronic control unit 3, 3.2 of the first and second control unit devices 3, 3.2.

THE LIST OF REFERENCE SIGNS IS AS FOLLOWS:

1 pressure control valve
2 solenoid valve
3 first ECU
3.2 second ECU
4.1 common solenoid valve connection
4.2 dedicated solenoid valve connection
4.3 dedicated solenoid valve connection
4 switch for common connection
5 switch for dedicated connection
6 switch for dedicated connection
7 switch for dedicated connection
8 switch for dedicated connection
9 short-circuit to supply or ground
10 short-circuit in supply lead
11 short-circuit between supply and return leads
12 short-circuit due to fused output stage
13 short-circuit between return lead and supply
14 short-circuit between return lead and ground
15 output stage
16 switch for common connection; output stage
17 logic unit
22.1 first voltage supply
22.2 second voltage supply
23 data bus
24 connection
25 connection

The invention claimed is:

1. A protective device for decoupling electric control circuits when at least one electropneumatic actuator is jointly used by a plurality of independently voltage-supplied control unit devices in a redundant system for autonomous driving, comprising:

at least one current flow blocking device configured to prevent a resulting flow of current to an electronic control unit of another of a first control unit device and a second control unit device when one of the first and second control unit devices applies a switched current to the at least one electropneumatic actuator;

wherein the at least one electropneumatic actuator has, in each case, a common connection, via which the at least one electropneumatic actuator can be coupled and switched to a common connection of at least one other electropneumatic actuator, and at least one dedicated connection, via which the at least one electropneumatic actuator can be individually supplied with current, wherein the plurality of control unit devices has the at least one first control unit device including a first electronic control unit and a first number of switching devices corresponding to the common connection and the number of dedicated connections of all the electropneumatic actuators, and has the at least one second control unit device including a second electronic control unit and a second number of switching devices corresponding to the common connection and the number of dedicated connections of all the electropneumatic actuators, and wherein the at least one first and second control unit devices are arranged to apply or not apply a switched current to the at least one electropneumatic actuator using the switching devices.

2. The device of claim 1, wherein the first and second control unit devices include a main brake control unit with the first electronic control unit and a backup brake control unit with the second electronic control unit, and the at least one electropneumatic actuator includes a solenoid valve or a pressure control module containing solenoid valves, wherein the first and second control unit devices are arranged to jointly access coils of the solenoid valves and/or of the pressure control modules, the coils being configured to be activated via the switching devices, and wherein the switching devices contain semiconductor switches and/or output stages configured to be supplied via a common supply and ground path.

3. The device of claim 1, wherein the switching devices are configured as electronic output stages, which are arranged to be controlled by a logic unit of the first or second electronic control unit, one output stage in each case being an output stage that connects the supply leads of an electropneumatic actuator to a positive potential, or an output stage that connects the return leads of the electropneumatic actuator to a negative potential or ground potential.

4. The device of claim 1, wherein the current flow blocking device is formed as a diode arranged on a connection of each of the switching devices.

5. The device of claim 4, wherein the diode is arranged inside the first and second electronic control units or outside the first and second electronic control units between the at least one electropneumatic actuator and each of the switching devices.

6. The device of claim 1, wherein a plurality of diodes are arranged in a diode circuit arrangement forming a T-piece, which operates equivalent to a single diode in each case.

7. The device of claim 1, wherein on the supply-potential side a reverse-polarized and actively switched output stage is arranged in a common current path section between the switching devices and the first and second electronic control units as the current blocking device, and on the ground-potential side a diode is arranged in a common current path section between the switching devices and the first and second electronic control units as the current blocking device.

8. The device of claim 1, wherein on the supply-potential side a diode is arranged in a common current path section between the switching devices and the first and second electronic control units as the current blocking device, and on the ground-potential side a reverse-polarized and actively switched output stage is arranged in a common current path section between the switching devices and the first and second electronic control units as the current blocking device.

9. The device of claim 1, wherein on the supply-potential side a reverse-polarized and actively switched output stage is arranged in a common current path section between the switching devices and the first and second electronic control unit as the current blocking device, and on the ground-potential side a reverse-polarized and actively switched output stage is arranged in a common current path section between the switching devices and the first and second electronic control unit as the current blocking device.

10. The device of claim 1, wherein:
the first and second electronic control units are configured to block the switching devices of both a positive and a ground line if no electropneumatic actuator is to be supplied with current,
in a fault-free operation in accordance with predetermined criteria, specifically only one of the first and second electronic control units performs the control of the at least one electropneumatic actuator,
an electronic control unit of the first and second electronic control units in a passive state is configured not to carry out an active supply of current to an electropneumatic actuator for testing purposes,
the electronic control unit in the passive state is configured to switch to an active state in the event of a fault in an active control unit of the first and second electronic control units that prevents further operation of the active control unit and, as a new active electronic control unit, to assume the control of the electropneumatic actuator instead of the faulty electronic control unit from then on, and
the electronic control unit in the passive state is configured to monitor voltage levels on its leads to the at least one electropneumatic actuator, to plausibility-check this monitoring with information transmitted to it by the active electronic control unit regarding a current activation of the at least one electric actuator, and to monitor a safe blocking of the current blocking device.

* * * * *